(12) United States Patent
Cichy

(10) Patent No.: US 11,363,925 B2
(45) Date of Patent: Jun. 21, 2022

(54) IN-LINE VACUUM FILTER

(71) Applicant: Marcin Czeslaw Cichy, Surrey (CA)

(72) Inventor: Marcin Czeslaw Cichy, Surrey (CA)

( * ) Notice: Subject to any disclaimer, the term of this patent is extended or adjusted under 35 U.S.C. 154(b) by 592 days.

(21) Appl. No.: 16/264,552

(22) Filed: Jan. 31, 2019

(65) Prior Publication Data

US 2020/0245832 A1 Aug. 6, 2020

(51) Int. Cl.
*A47L 9/14* (2006.01)
*A47L 9/32* (2006.01)
*B01D 46/10* (2006.01)
*B01D 46/42* (2006.01)
*B01D 46/00* (2022.01)

(52) U.S. Cl.
CPC .......... *A47L 9/1409* (2013.01); *A47L 9/1463* (2013.01); *A47L 9/327* (2013.01); *B01D 46/0012* (2013.01); *B01D 46/103* (2013.01); *B01D 46/4227* (2013.01); *B01D 2273/14* (2013.01); *B01D 2279/55* (2013.01)

(58) Field of Classification Search
None
See application file for complete search history.

(56) References Cited

U.S. PATENT DOCUMENTS

| 684,692 | A | * | 10/1901 | Jarvis | B01D 46/10 |
| | | | | | 55/422 |
| 954,164 | A | * | 4/1910 | Broekema | A47L 5/28 |
| | | | | | 15/350 |
| 2,046,636 | A | * | 7/1936 | Kitto | A47L 9/19 |
| | | | | | 434/370 |
| 2,293,920 | A | * | 8/1942 | Benson | A47L 9/248 |
| | | | | | 406/36 |
| 2,467,652 | A | * | 4/1949 | Beede | A47L 9/19 |
| | | | | | 434/370 |
| 2,613,454 | A | * | 10/1952 | White | A47L 9/19 |
| | | | | | 434/370 |
| 2,849,080 | A | * | 8/1958 | Enright | A47L 9/104 |
| | | | | | 96/416 |
| 2,910,717 | A | * | 11/1959 | Raymond | A47L 9/248 |
| | | | | | 15/246.2 |
| 4,341,540 | A | * | 7/1982 | Howerin | A47L 7/0014 |
| | | | | | 15/353 |
| 4,825,502 | A | * | 5/1989 | Armstrong | A47L 9/104 |
| | | | | | 15/339 |

(Continued)

*Primary Examiner* — Christopher P Jones
*Assistant Examiner* — Brit E. Anbacht
(74) *Attorney, Agent, or Firm* — Intellent Patents LLC; Ahmed Alhafidh

(57) ABSTRACT

An in-line vacuum filter comprises a manifold having an inlet, an outlet, a collecting container, and an actuatable filter paddle. A flow of air generated by a source of negative pressure travels from the inlet to the outlet. The actuatable filter paddle is positioned within the manifold such that it can be actuated between a first position and a second position. In the first position, the actuatable filter paddle is placed within the flow of air and in the second position, the actuatable filter paddle is removed from the flow of air. The filter paddle is preferably arcuate concave and comprises a plurality of apertures. In the first position, the filter paddle gradually diverts objects larger than a width of the apertures away from the flow of air. Diverted objects may travel to a removable collection container.

3 Claims, 7 Drawing Sheets

(56) References Cited

U.S. PATENT DOCUMENTS

| | | | | |
|---|---|---|---|---|
| 4,833,753 | A * | 5/1989 | Muller | A47L 9/104 |
| | | | | 15/339 |
| 5,375,293 | A * | 12/1994 | Gilbertson | A47L 9/104 |
| | | | | 15/339 |
| 5,411,150 | A * | 5/1995 | Sigurdsson | A47L 9/0072 |
| | | | | 15/339 |
| 5,667,080 | A * | 9/1997 | Klein | A47L 5/24 |
| | | | | 209/614 |
| 8,429,788 | B1 * | 4/2013 | Lovelady | A47L 7/0009 |
| | | | | 15/320 |
| 9,688,429 | B2 * | 6/2017 | Luckau | B65F 1/1405 |
| 9,795,263 | B1 * | 10/2017 | Perkins | A47L 9/104 |
| 10,478,034 | B2 * | 11/2019 | Han | A47L 9/1608 |
| 2002/0178696 | A1 * | 12/2002 | Korff | A47L 9/248 |
| | | | | 55/337 |
| 2003/0010380 | A1 * | 1/2003 | Sellick | F16T 1/14 |
| | | | | 137/187 |
| 2015/0209708 | A1 * | 7/2015 | Ordakowski | B01D 46/0002 |
| | | | | 55/501 |
| 2015/0373875 | A1 * | 12/2015 | Kira | H05K 7/20181 |
| | | | | 96/407 |
| 2016/0270616 | A1 * | 9/2016 | Noh | A47L 9/02 |
| 2017/0258283 | A1 * | 9/2017 | Hardin | A47L 7/009 |
| 2020/0046186 | A1 * | 2/2020 | Woodbury | A01M 3/005 |
| 2020/0276522 | A1 * | 9/2020 | Miyagi | F16H 57/0404 |

* cited by examiner

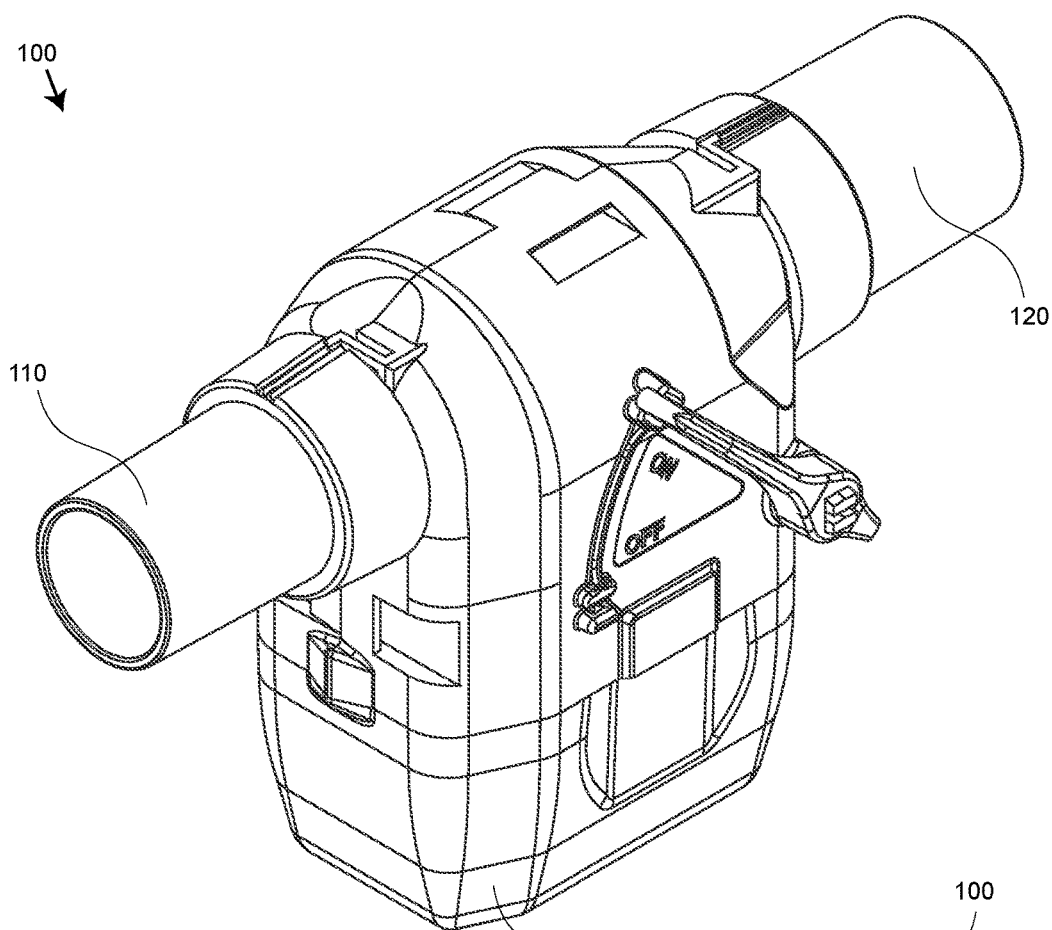
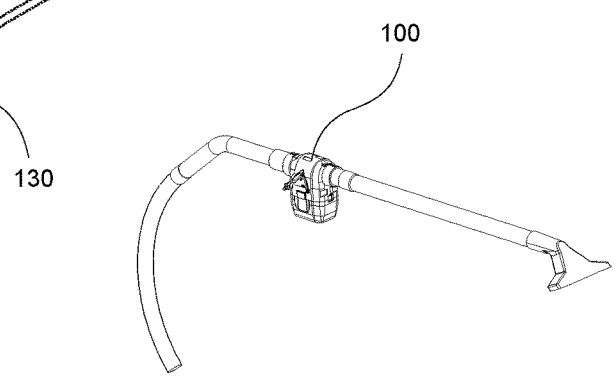
FIG. 1A
FIG. 1B

IN-LINE VACUUM FILTER

FIELD OF TECHNOLOGY

This specification relates generally to a vacuum cleaner hose attachment. More specifically, the disclosure pertains to an in-line vacuum filter attachment including a collection unit which may gently trap suctioned items for retrieval independent of the main vacuum waste chamber; furthermore, the in-line vacuum filter attachment may allow for the concurrent use of other varieties of vacuum attachments.

BACKGROUND

Nearly every household owns a vacuum cleaner, as it is a utility item which serves many cleaning purposes. Traditional vacuum machines stand upright and comprise a base equipped with a vacuum chamber configured to generate suction through negative pressure and another chamber for holding a waste container. As a vacuum operates over a substantially flat surface, the base of the vacuum maintains suction which picks up materials on the ground as it passes over, depositing the waste into the waste container or bag held therein. In addition to a suctioning base, most vacuums also allow a user to collect waste through a collecting extension coupled to the vacuum chamber, often in the form of a hose or tubular extensions with the option of related attachments.

It is with the hose that the vacuum achieves the most utility, as a vacuum hose may improve the vacuum cleaner's applicability in unique environments. The typical vacuum hose and its accompanying attachments allow for the suctioning of waste material from a variety of desired locations, as the hose may be moved and controlled manually to reach into corners, under furniture, or across inconsistent surfaces. Typically, the hose is an extension of the vacuum body or base, and the offered attachments have a tubular attachment base, allowing for a secure link to the hose. The head of the attachment is typically modified in shape, size, or construction in order to allow a user to address a variety of messes.

The hose, like the base, guides collected materials into a central waste container or bag. Occasionally, vacuum cleaners offer alternate configurations for the suction base as well as the hose, allowing a user to change, for example, the rate of suction or the clearance between the surface and the base. In some embodiments, vacuum cleaners comprise only the suctioning element, a hose extension, and options for attachments, i.e., they maintain no base which generates suction underneath. For example, a canister vacuum functions in this way. For this reason, the most common modifications made for vacuum cleaners are oriented towards the hose and its attachment capabilities.

Many attachments exist for a vacuum, with examples being attachments oriented towards cleaning dog hair from materials and surfaces, suctioning large liquid spills, reaching into angled or tight locations, or brushing away fine dust while collecting large particles. The versatile functioning of the vacuum cleaner and its accompanying attachments has kept its demand consistent within the consumer market. Attachments continue to be designed in order to improve vacuum efficacy and modernization. However, all attachments guide suctioned material into a single waste chamber.

There currently exists no vacuum hose attachment with the ability to trap items or materials desired for retrieval prior to filtering said items and materials into the main vacuum waste chamber. Because of this, the present options for retrieving vacuumed items are not viable. The options for retrieval of vacuumed items include sifting through a waste chamber to search for the desired items, placing a stocking in a vacuum hose in order to prevent the passage of larger vacuumed materials, or the insertion of a clean vacuum bag into the waste chamber prior to vacuuming. None of these methods guarantee a safe or clean return of items.

One may choose to simply vacuum items desired for retrieval into the waste chamber and sift through the materials after, but sifting through a dirty waste chamber is not ideal. When sifting through the waste chamber for desired items, it is possible to accidently spill or spread the materials and waste present in the waste chamber, creating a larger mess. Additionally, the waste chamber may contain glass or other sharp objects that have been collected, which could potentially cut or harm a user as they sift through the waste chamber materials. Furthermore, it is common for insects such as spiders to be sucked into a waste chamber during vacuuming, and sifting through the waste chamber may mean encountering or releasing previously contained pests.

Another way to filter out objects desired for retrieval is to place a porous fabric, such as sheer stockings, between tube attachments in order to retrieve caught items thereafter. However, this is a temporary solution and the stockings must usually be discarded after each use due to damage. This could prove costly and is a large hassle, as one may not always have a viable stocking available. Furthermore, most materials that may be positioned in-line without compromising airflow may not filter uniformly or may cause blockages to occur. Because of this, the suction of the vacuum may be severely hampered, leading to a complete loss of functionality. Temporary, makeshift filtration solutions only provide partial, unreliable results—the user may still end up digging through lint to find crumbs.

A final option for retrieving items that have been suctioned may be to empty the waste chamber or deposit a fresh waste bag into the chamber before suctioning materials desired for retrieval, but that would still mean sorting through mounds of particulate matter, or it could prove wasteful by discarding a waste chamber bag not yet full. Ultimately, in-home, quick-fix options for retrieving items that have been suctioned are not sufficient, as they may harm the user, become expensive, prove dirty and uncomfortable, or lead to habitual waste.

Although there are currently no manufactured options to assist in the clean and safe retrieval of vacuumed items, the need for such an option is present. It is common for materials not intended for disposal to spill, get dropped, or lost in a home, workshop, or business. Because of this, there exists a need for a vacuum attachment which offers the ability to efficiently retrieve dispersed materials. For example, if a mechanic were to spill a box of nuts and bolts, he or she would need to manually retrieve them, either directly from the ground or by rummaging through the vacuum waste contents. In a further example, a pet owner would likely dispose dry pet food collected in the waste container instead of picking out the individual pieces. Additionally, food or fragile items such as jewelry may disintegrate or become damaged due to the drastic changes in momentum along the path to the waste container.

This is especially important when considering items such as pills. Medications are often administered in controlled dosages, and the loss of a pill would mean interrupting dosage for a potentially lifesaving treatment. The ability to retrieve dropped pills free of contaminants and damage could be the difference between a successful and unsuccessful treatment of an ailment. The ability to collect a small or large assortment of items without concerns as to the integrity or cleanliness of the item(s) is invaluable.

Thus, there exists a need for a vacuum hose attachment in-line vacuum filter offering the ability to collect dropped or dispersed material without damaging collected materials, without requiring a sorting mechanism inside the waste chamber, and without needing to perform manual vacuum modifications or demanding physical movements such and bending over or getting onto the ground.

SUMMARY

In accordance with the foregoing objectives and others, exemplary in-line vacuum filters are disclosed herein. The described embodiments describe a configurable manifold comprising an actuatable filter paddle which may be toggled between different orientations or positions to filter away objects larger than the individual apertures of the actuatable filter paddle.

In one aspect, an in-line vacuum filter is provided. The in-line vacuum filter comprises a manifold having an inlet, an outlet, a collecting container, and an actuatable filter paddle. A flow of air generated by a source of negative pressure travels from the inlet to the outlet, indicative of a vacuum environment. The actuatable filter paddle is disposed within the manifold such that it can be actuated between at least a first position and a second position. In a first position, the actuatable filter paddle is placed within the flow of air. In a second position, the actuatable filter paddle is removed from the flow of air.

The actuatable filter paddle may comprise an arcuate concave filter. The arcuate concave filter may incorporate an axle from which a lever is attached. Acting upon the level may actuate the actuatable filter paddle, transitioning the actuatable filter paddle to the first position or the second position. The actuatable filter paddle may be actuated between the first position and the second position through an actuation method selected from the group consisting of: sliding the actuatable filter paddle, rotating the actuatable filter paddle around an axis extending through the axle. Other actuation methods are contemplated and are within the scope of the exemplary embodiments.

The arcuate concave filter may have a plurality of apertures. The apertures may be elongate with a uniform width of approximately 1 mm. In any position of the actuatable filter paddle, the flow of air is largely unimpeded. Additionally, in the first position, the actuatable filter paddle may allow passage of particulate matter to the outlet and may divert objects larger than a width of the apertures away from the flow of air. Subsequently, the diverted objects may be diverted into a removable collection container of the manifold.

The curvature and concavity of the arcuate concave filter may be configured to gradually divert the momentum of objects larger than the width of the apertures without causing disintegration of said objects due to impact against the arcuate concave filter. The manifold may comprise a lipped portion on an interior surface thereof, wherein the lipped portion holds the actuatable filter paddle in the first position as the flow of air passes through the actuatable filter paddle.

The inlet and outlet may each be outfittable with an adapter allowing the in-line vacuum filter to fit any conventional vacuum hose, pipe, heads, and handles. The adapters are each reconfigurable to fit non-conventional vacuum hose, pipe, heads, and handles.

The actuatable filter paddle may comprise a detachable filter module configured to cover one or more apertures of the actuatable filter paddle.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1A is a top perspective view of the in-line vacuum filter, according to one or more embodiments.

FIG. 1B is a schematic drawing of the in-line vacuum filter used with traditional vacuum components, according to one or more embodiments.

DETAILED DESCRIPTION

Disclosed are various embodiments of an in-line vacuum filter. In most embodiments, the filter is an attachment to any current vacuum systems, including handheld, canister, upright, or other vacuums which provide means for applying attachments to modify the utility thereof.

Referring to FIG. 1A, a top perspective view of an in-line vacuum filter 100 ("filter") is illustrated. The filter 100 allows for a subset of items or materials being vacuumed to be collected into a collection chamber 130 of the filter 100 independent of a primary waste chamber of a vacuum machine. By integrating the filter 100 within a hose/tubular assembly of a vacuum as shown FIG. 1B, the present invention may act as an intermediary between the main waste chamber of a vacuum machine and the materials being suctioned, and more specifically, may be positioned within the flow of suctioned air. When the flow of vacuumed objects meet the filter, the filter allows particulate matter through to the primary waste chamber, such as dust, pollen, soot, crumbs, and other fine, disposable objects and filters out larger objects to be stored for later retrieval.

To provide coupling means to existing vacuum cleaners, the filter comprises a tubular attachment adapter 110 which allows a user to secure a vacuum hose to the filter. The filter comprises a further tubular attachment adapter 120 to which other hose attachments may be secured, e.g., rigid tubular extensions, replaceable heads, more vacuum hose. A flow of vacuumed items is fed to the filter via the first tubular attachment adapter 110 and a filtered flow of vacuumed items may leave through the second attachment adapter 120.

Although the present embodiments utilize a tubular-type attachment, it will be appreciated that other form factors may be used having, for example, an annular, square, or irregularly-shaped profile. A substantially annular profile may be preferred since it presents few if any points where dust can easily accumulate.

By preventing materials from immediately entering the waste chamber during vacuuming, the filter 100 may retrieve suctioned items without requiring a user to sift through all waste present in the waste chamber. By allowing for materials to be collected independent of the vacuum waste chamber, a user may find a new utility in vacuum use. Through the use of the in-line vacuum filter 100, one may use a vacuum not just simply to clean undesirable waste, but also to retrieve individual categories of items not desired for waste with the expedience a vacuum offers. Furthermore, the in-line vacuum filter 100 ensures the safety of items desired for retrieval, allowing for the confident retrieval of fragile or valuable materials and items.

Figure 2A:
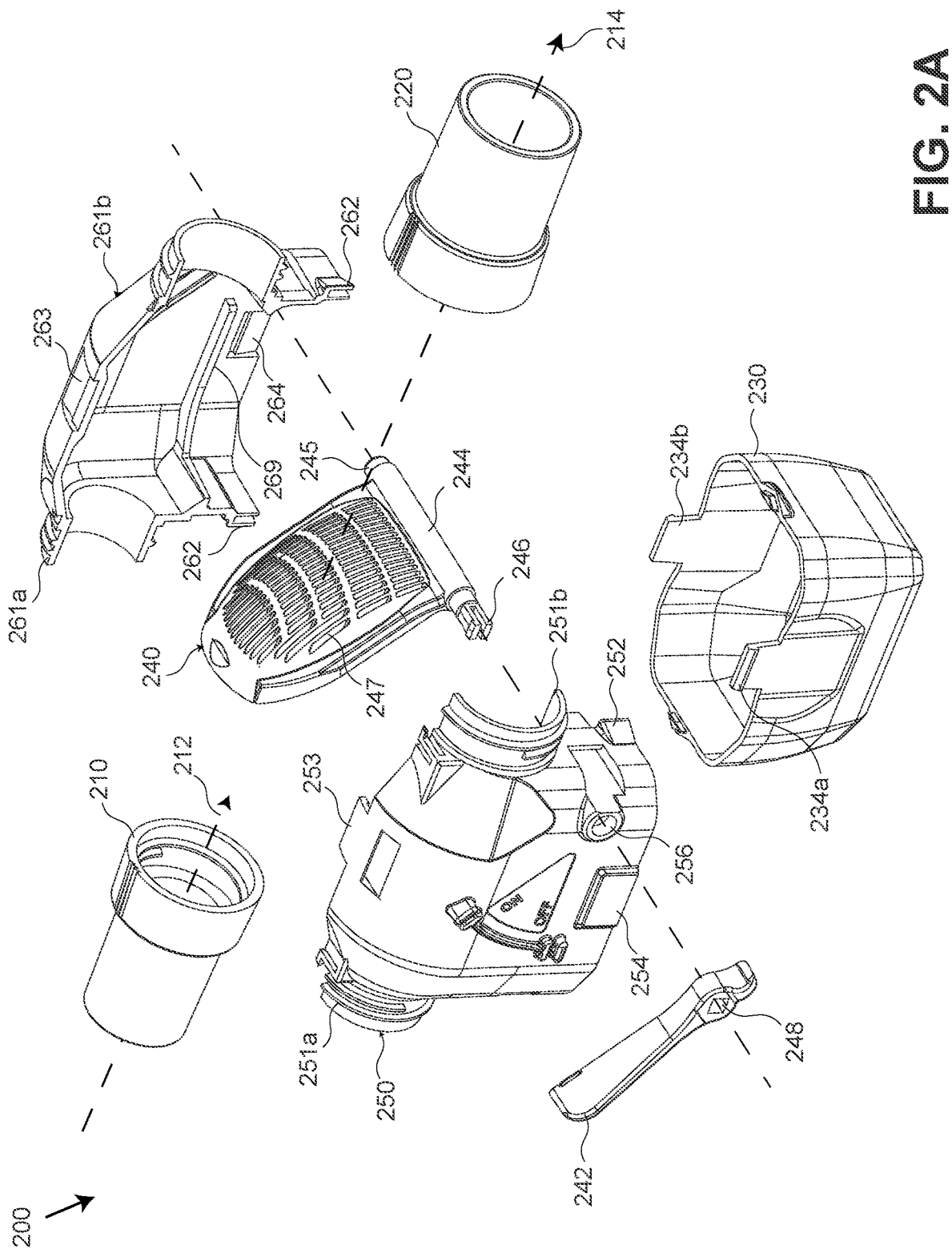
FIG. 2A is a top perspective, exploded view of the in-line vacuum filter, according to one or more embodiments.
Figure 2B:
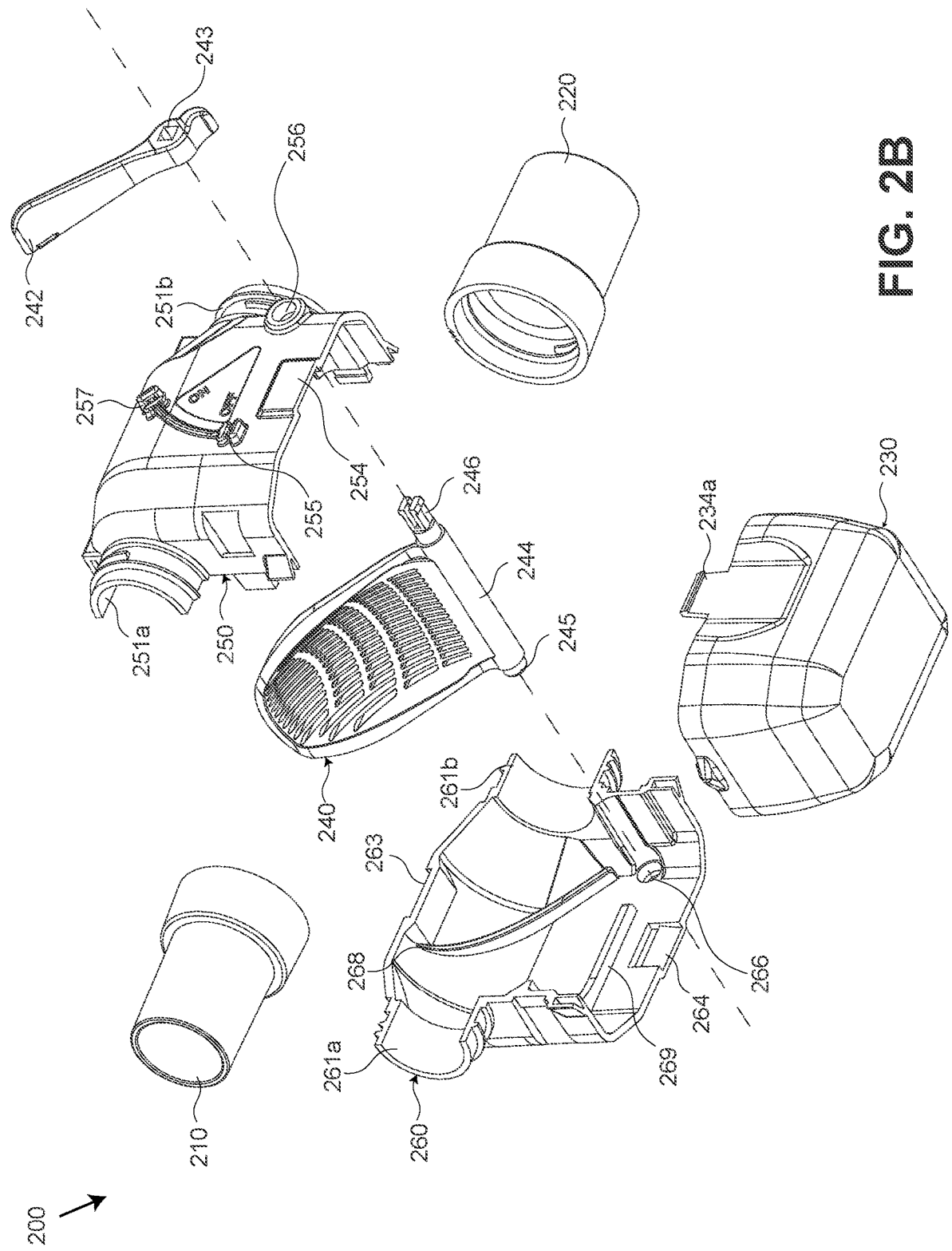
FIG. 2B is a bottom perspective, exploded view of the in-line vacuum filter, according to one or more embodiments.
Figure 2C:
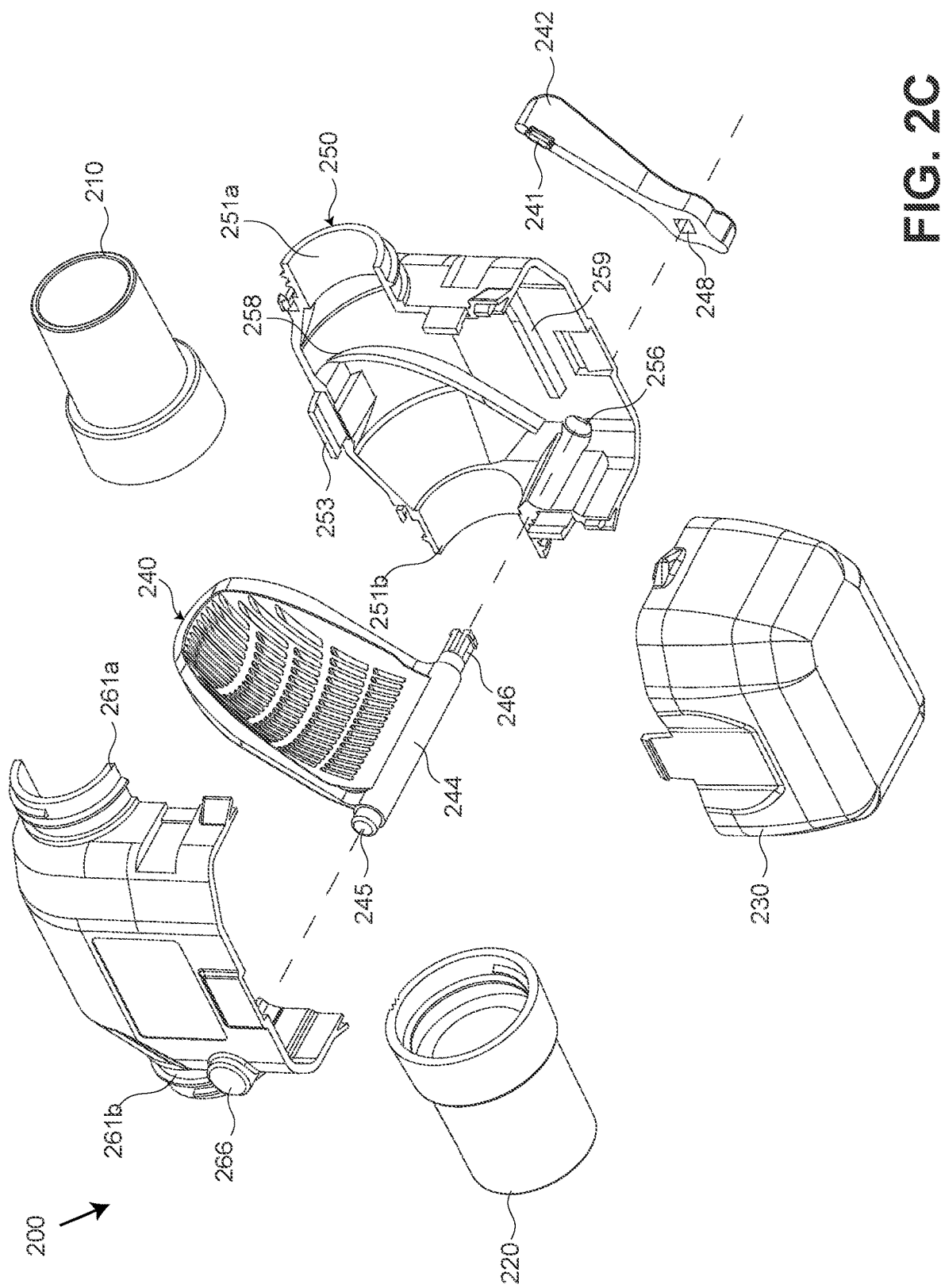
FIG. 2C is a bottom, rear perspective exploded view of the in-line vacuum filter, according to one or more embodiments.

Referring to FIGS. 2A-C, perspective exploded views are illustrated. The filter 200 gradually redirects and attenuates the momentum of objects to allow a user to reclaim fragile items such as pills, food-stuff, or jewelry. In some embodiments, the filter 200 utilizes an actuatable filter paddle 240 which may be positioned in a flow of vacuumed items 212. In a further embodiment, the filter paddle 240 is an arcuate concave screen and provides a sloped path. In all cases, the filter paddle 240 guides a flow of large materials in such a way that allows for a gradual decrease in momentum while allowing a flow of filtered air 214 to continue passing freely through the filter paddle 240.

In some embodiments, the filter paddle 240 comprise a plurality of apertures large enough to allow particulate matter to pass through, but small enough as to prevent the passage of items desired for collection into the waste chamber. As such, the in-line vacuum filter 200 spares the user from encountering dirty, unseemly, or uncomfortable matter in the waste chamber while fishing for desired items.

Materials which may be collected using the in-line vacuum filter 200 include, but are not limited to, paper clips and tacks, cereal and snacks, beads or jewelry, coins, game pieces, nails or small building materials, small equipment parts, decorations such as shells or stones, medications in the form of pills, or hair bands and hair accessories. If an item were lost, such as a valuable piece of jewelry, it would be possible to suction the item through the hose attachment without it being deposited directly into the waste chamber. This would allow the item to be secured quickly and without doubt as to whether it will encounter damage or become lost in an assortment of other items.

The ability to collect materials from a variety of surfaces at challenging angles may also provide for the retrieval of lost or dropped items from otherwise inaccessible locations. It may also allow for handicapped individuals to reach dropped items if they are unable to bend over or get onto their knees. Some vacuum attachments offer a tube extension, and this may be used to reach under furniture or into cracks and corners. Were an elderly individual to drop their bottle of pills under a table or chair, rather than bending down to pick it up, they may attach an extension tube onto the end of the in-line vacuum filter 200 and suction the pills securely into the in-line vacuum filter without ever needing to bend over or get on the ground. Furthermore, there exists vacuum attachments which offer a narrow, extended nozzle in order to reach into tight places. With the ability to utilize such an attachment in accompaniment with the in-line vacuum filter, it is possible to collect dropped or stuck items from spaces unreachable manually, or undesirable to place a hand into.

For example, were someone to drop a valuable piece of jewelry under a heavy piece of furniture, it would be easy to attach a narrow nozzle attachment to the in-line vacuum filter and retrieve the item without struggling to reach it manually or being forced to move heavy furniture. In another instance, an object desired for retrieval may be dropped or scooted under a static article of furniture, such as a bathroom vanity or built-in bed. In this case, the furniture may not be moved in order to retrieve items underneath. By attaching a vacuum extension to the in-line vacuum filter, one may slide the hose attachment under the stationary furniture and collect the item(s) desired for retrieval. This would prove especially effective were the users hand and arm too large to fit under the space, or if the user did not want to put a hand into a space that may have nails sticking out or insects nesting.

Offering the ability to filter away large items while also maintaining a design oriented towards damage-free collection, the in-line vacuum filter 200 builds on the utility of the vacuum cleaner and its various attachments without impairing the performance of the vacuum. Currently, in relation to prior art, there exists no vacuum attachment comparable to the in-line vacuum filter of the present invention.

The first tubular attachment adapter 210 and the second tubular attachment adapter 220 may be an inlet for vacuumed objects and an outlet for filter vacuumed air, respectively. Both adapters are hollow in nature and may allow slip fitting thereon of a hose, tubular attachments, vacuum head, or other like objects having an annular coupling means. In other embodiments, the adapters may connect to further attachments via threading, barbed insert, magnetism, adhesive, or other interlocking means. The first tubular attachment adapter 210 and the second tubular attachment adapter 220 may maintain the same length, circumference, and shape. Inversely, the first tubular attachment adapter 210 and the second tubular attachment adapter 220 may differ in length, circumference, or shape.

The filter 200 comprises a manifold which envelopes the filter paddle 240 and allows the filter paddle 240 to be actuated between an engaged position and a disengaged position, and stores filtered items in a receptacle 230 thereof. Specifically, the filter 200 comprises a plurality of interlocking portions, including the receptacle 230, an anterior portion 250 and a posterior portion 260. In one embodiment, as shown, the anterior portion 250 interlocks with the posterior portion 260 through interlocking means 252 and 262 respectively and interlocking means 253 and 263 respectively. Together, the anterior portion 250 and posterior portion 260 subsequently interlock with the receptacle 230 through interlocking means 234a-b, 254, and 264. Specifically, interlocking means 234a interlocks with interlocking means 254 and interlocking means 234b interlocks with interlocking means 264. However, interlocking means 234a may instead interlock with interlocking means 264 and interlocking means 234b may instead interlock with interlocking means 254.

The interlocking mechanisms allow for the anterior portion 250 and the posterior portion 260 to lock flush against one another. This may be facilitated through, but not limited to, a single or series of snapping or interlocking portions, magnetism, sealing O-rings or adhesive qualities, with the primary requirement of forming an airtight seal. Once sealed, a threaded portion 251a of the anterior portion 250 and a threaded portion 261a of the posterior portion 260 may join to create a threaded coupler to complement the tubular attachment adapter 210. Similarly, a threaded portion 251b of the anterior portion 250 and a threaded portion 261b of the posterior portion 260 may join to create a threaded coupler to complement the tubular attachment adapter 220. The threaded couplers of the anterior portion 250 and the posterior portion 260 may be male or female and the respective threaded portions of the tubular attachment adapters 210 and 220 may be configured to complement the threaded couplers of the anterior portion 250 and the posterior portions 260.

In one embodiment, the filter paddle 240 has a scoop-like shape, i.e., arcuately curved such that its front and rear surfaces slopes similarly to an axle 244. The axle 244 further comprises a lateral protrusion 245 and a snap fitting 246. The protrusion 245 sits within a socket 266 of the posterior portion 260 and the snap fitting 246 extends through an aperture 256 of the anterior portion 250. Positioned within the anterior portion 250, the snap fitting 246 fits through an aperture 256 and is fitted to a filter lever 242 positioned exterior to the filter 200 and transverse to the axle 244.

In one embodiment, a filter lever 242 positioned exterior to the filter 200 may be used to rotate the filter paddle 240 around an axis passing through the axle 244 as shown. The filter lever 242 may comprise an aperture 248 through which a plurality of cantilever snap joints of the snap fitting 246 may extend. The snap joints may protrude from the axle 244. When extended through the aperture 243, the snap joints are cantilevered towards each other due to an angular bevel at the tip of the snap joints which allows the snap joints to slide into the aperture 248. Once the snap joints of the snap fitting 246 clear the aperture 243, the snap joints snap away from each other and hold the filter in place. Undoing the snap fitting 246 may involve squeezing the snap joints and pushing the snap fitting 246 through the aperture 248. Between the snap fitting 246 and the axle 244 may be a nominal-length, annular protrusion which sits in the aperture 256, allowing the filter paddle 240 to be held in place but maintain activatability.

The filter lever 242 may be actuated and subsequently held in an engaged position 257 or a disengaged position 255. Each of the engaged position 257 and disengaged position 255 is defined as being between two closely adjacent, parallel protrusions from the surface of the anterior portion 250. Each position comprises an inner, shorter protrusion and an outer, longer protrusion, each protrusion comprising a rounded end. The filter lever 242 may additionally comprise a rounded notch 241 which may provide the filter lever 242 additional clearance from the anterior portion 250. The rounded notch 241 may be manually pushed relatively easily over the inner protrusion but not over the outer protrusion. As will be shown later, rotating the filter lever 242 only exerts effective shear forces on the snap fitting 246 since the filter paddle 240 is held internally between the anterior portion 250 and the posterior portion 260.

In another embodiment, the filter paddle 240 may be actuated by sliding the filter paddle 240 using the filter lever 242 from the engaged position 257 to the disengaged position 255. In one embodiment, the filter paddle 240 may be insertable through a slot of the manifold, e.g., replacing the portion of the manifold where the axle 244 is held in place. The slot may be disposed so that inserting the filter paddle 240 positions the filter paddle in the engaged position.

In an engaged position, the filter paddle 240 may rest against an upper lip 258 and an upper lip 268 of the anterior portion 250 and the posterior portion 260, respectively. The upper lips 258 and 268 may be protrusions that outline the outer rim of the filter paddle 240 and hold the filter paddle 240 in place as air travels past. Similarly, in the disengaged position 255, the filter paddle 240 rests against a lower lip 259 and lower lip 269 of the anterior portion 250 and posterior portion 260 respectively, which similarly hold the rim of the filter paddle 240 such that the filter paddle 240 lies completely out of the way of the flow of air.

Although the filter paddle 240 has been described as actuatable via a rotational or sliding means, it will be appreciated that other methods of actuating the filter paddle 240 and/or holding the filter paddle 240 in particular positions (e.g., disengaged position, engaged position) may also be used to effectively operate the in-line vacuum filter 200. For example, a compression spring may be disposed such that the filter paddle 240 is sprung into an engaged position by the compression spring and a locking mechanism holds the filter paddle 240 in a disengaged position after the filter paddle 240 is compressed. In another example, an elastic mechanism may be used to pull the filter paddle 240 to a relax engaged position unless another force is used to push the filter paddle 240 to lock it into a tensioned disengaged position. Other configurations will be understood to be within the scope of the embodiments described herein.

Figure 3A:
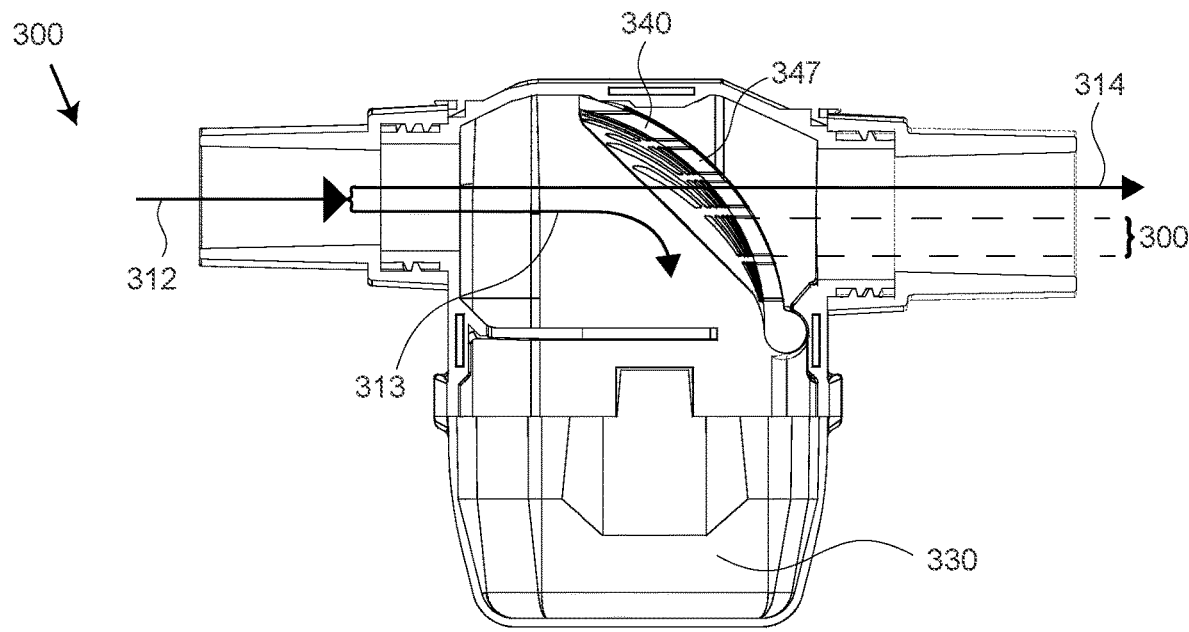
FIG. 3A is a front section view of the in-line vacuum filter in an engaged position, according to one or more embodiments.
Figure 3B:
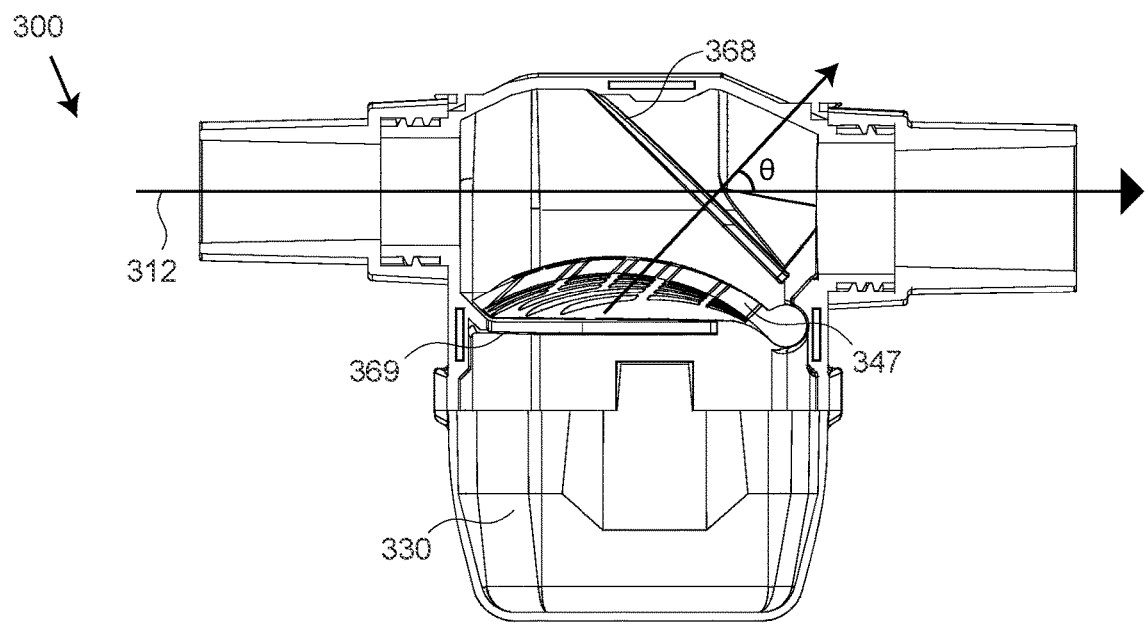
FIG. 3B is a front section view of the in-line vacuum filter in a disengaged position, according to one or more embodiments.

Referring to FIGS. 3A-B, front section views of the in-line vacuum filter 300 are shown. As shown in FIG. 3A, the filter paddle 340 is in an engaged position, i.e., the filter paddle 340 is in a position to filter out objects that will not pass through the apertures of the filter paddle 340 and redirect them into the receptacle 330. A tangent of the filter paddle 340 at the top end of the curvature may be substantially parallel to the flow of incoming air 312 whereas a tangent of the filter paddle 340 at the bottom end of the curvature may be substantially perpendicular to the flow of air, i.e. parallel to a desired direction for collected items 313. Tangents along the curve change slope gradually, signifying the similarly gradual change in momentum and direction of objects larger than the apertures of the filter paddle 340.

In one or more embodiments, the apertures 347 of the filter paddle 340 may be slits or slit-like openings in the filter paddle 340. Although the dimensions of the apertures 347 may be any size or shape, it is preferred for the apertures 347 to be narrow slits having, for example, a width of about 1 mm. Regardless of the length of the apertures 347, a width of about 1 mm is preferred in order to impart an adequate level of stiffness in the filter paddle 340. A vertical length 347a of the apertures 347 in an engaged position may be substantially uniform and/or vary as needed to impart an adequate level of stiffness in the filter paddle 340. When the filter 300 is in an engaged position as shown in FIG. 3A, the directionality of the apertures 347 matches that of an expected flow of particulate matter 314. In a disengaged position as shown in FIG. 3B, the apertures 347 face the direction of the flow of air 312 at an acute incidence angle Θ. In this case, the flow of air 312 actually exerts, at least partially, a receptacle-ward force on the sections of the filter 340 between the apertures 347. Air, however, does not proceed into the receptacle 330 because the receptacle 330 does not comprise air outlets, causing the interior of the receptacle 330 to rise in pressure. Since the apertures 347 face away from the origin of the direction air 312, vacuumed items, including large objects, continue to the primary waste chamber unfiltered.

In another embodiment, the manifold of the filter 300 may comprise an attachment point, allowing the filter 300 to be removably attachable to, for example, a fixed structure such as a wall. Or, the filter 300 may be removably attachable to an existing vacuum manifold. As such, the contents of the filter 300 may be localized and made easily accessible without having to haul the filter 300 around when using the vacuum. This may be especially applicable where central vacuuming systems are concerned. In such a case, the receptacle 330 may be larger to accommodate a larger volume of objects. In a further embodiment, the actuatable filter paddle 340 may be remotely actuated through, for example, a servomotor attached to the axle 244 or a solenoid (in the case of a slidable filter paddle 340).

Figure 4:
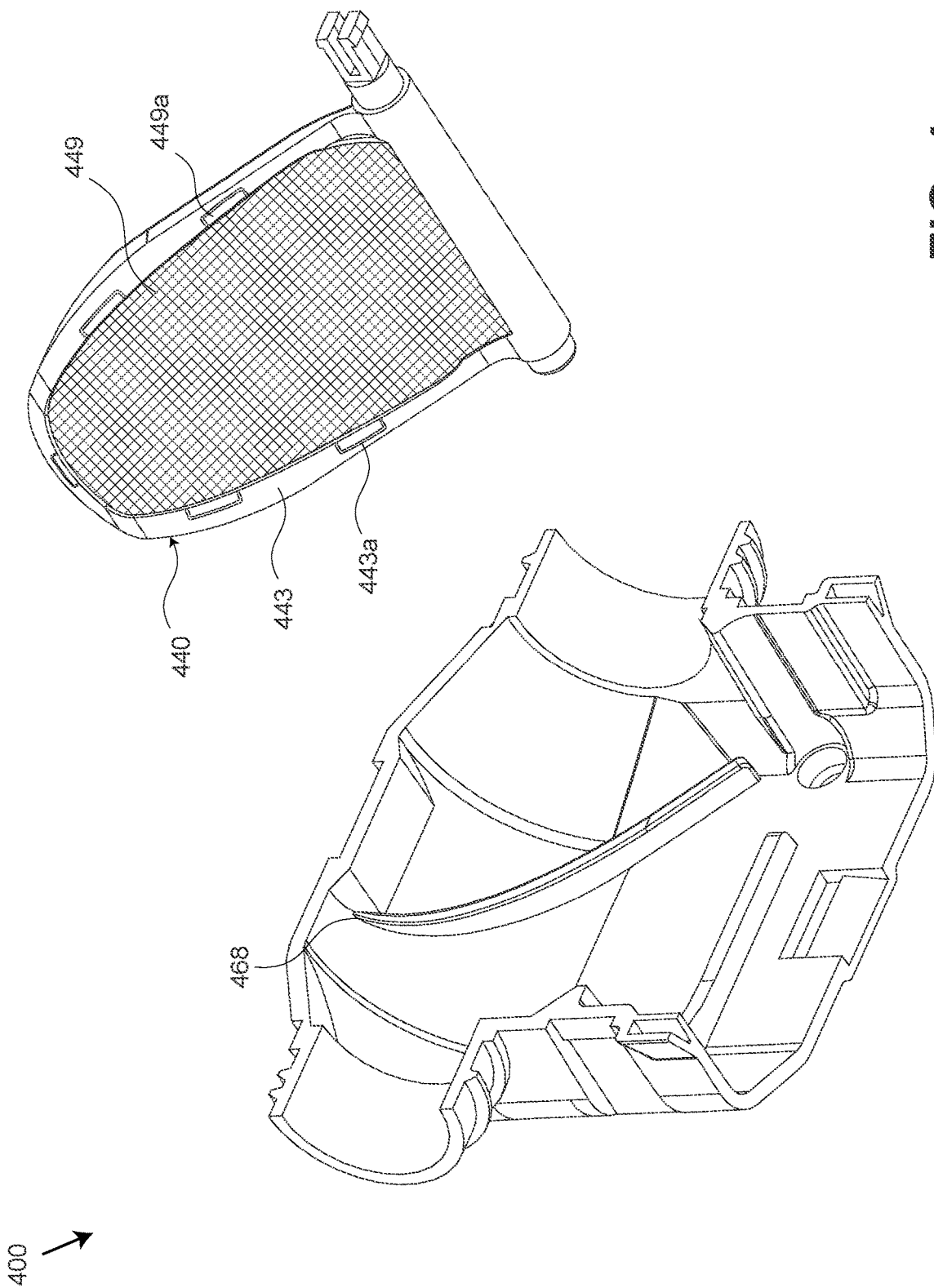
FIG. 4 is a perspective view of a filter paddle having a detachable filter insert, according to one or more embodiments.

Referring to FIG. 4, a filter paddle having a detachable filter insert is shown. In another embodiment, the filter paddle 440 may comprise a single aperture comprising an outer rim 443 to which a detachable filter module 449 may be applied. The detachable filter module 449 may comprise one or more lateral protrusions 449a which may rest against the outer rim 443, and in a further embodiment, the lateral protrusion(s) 449a may rest within one or more recesses 443a of the outer rim). In yet a further embodiment, the recesses 443a may comprise a pair of spaced protrusions, allowing the later protrusion(s) 449a to fit in between and the spaced protrusions and be held in place. In any case, when the filter paddle 440 is in the engaged position, the outer lip 468 of the posterior portion 460 and the outer lip of the anterior portion (not shown) may hold the filter paddle 440 in place by opposing the force exerted by the flow of air.

In one embodiment, the detachable filter module 449 may comprise a fine mesh filter. The detachable filter module 449 may be reusable and can be snapped off to brush away lint and snapped back on to the filter paddle 440 to resume filtering. Or, the detachable filter module 449 may be disposable, i.e., only used a single time and subsequently discarded. The width of the individual apertures of the detachable filter module 449 may be similar to the apertures shown in FIGS. 1-3B or a different shape entirely. For example, the apertures may be substantially minute so as to capture minute sand particles, rice, gems, crystals, sugar grains, or other miniscule objects. In another embodiment, the apertures of the detachable filter module 449 may be a grid having a varying depth. The walls of the grid may be rigid or flexible. Additional depth may add rigidity to the structure of the rotatable filter paddle 440.

Figure 5:
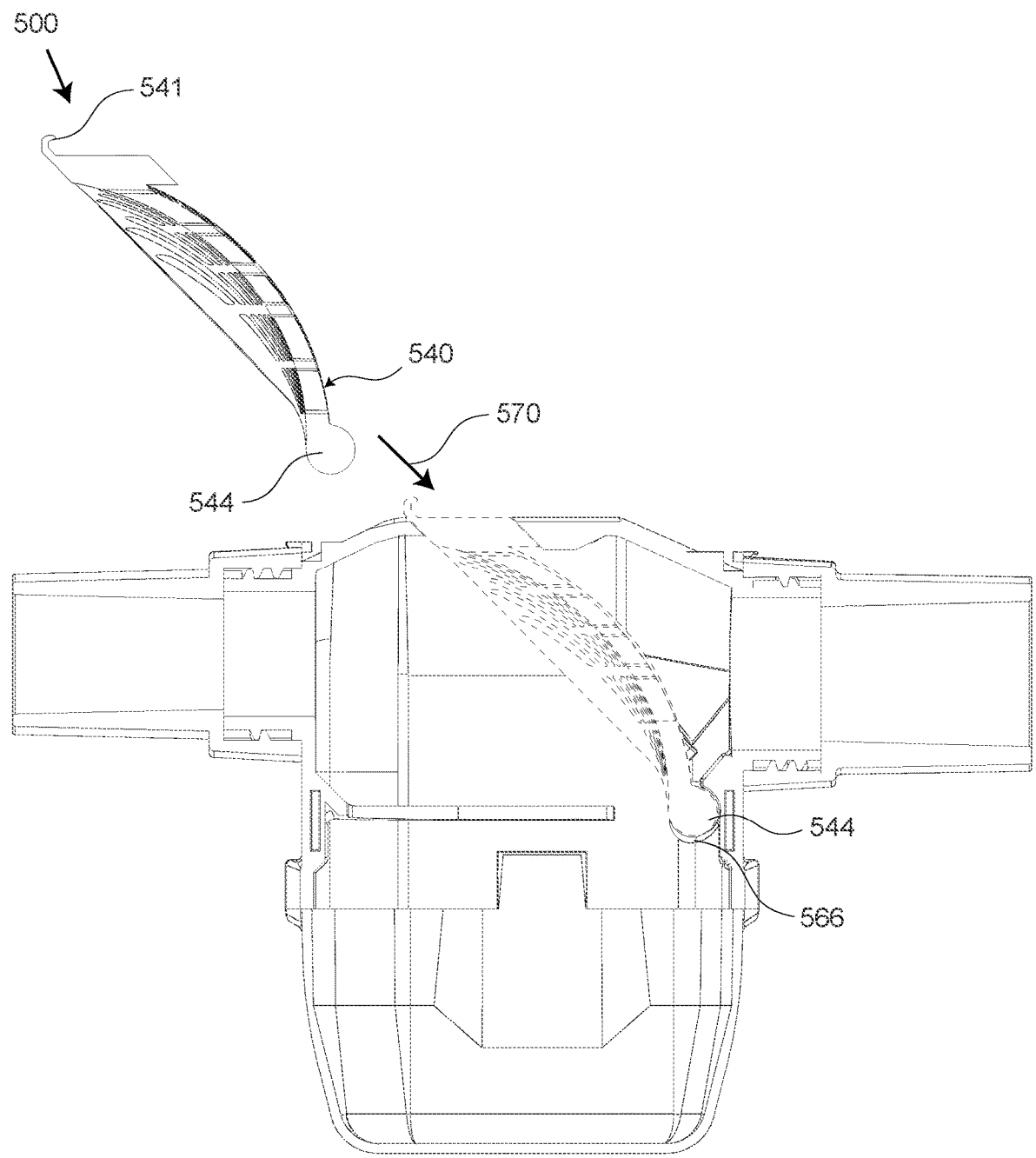
FIG. 5 is a front section view showing a slidable filter paddle, according to one or more embodiments.

Referring to FIG. 5, an exemplary in-line vacuum filter 500 having a slidable filter paddle 540. As shown, the slidable filter paddle 540 may be slid through a slot positioned at the top of the manifold (i.e., in the anterior portion 250 and the posterior portion 260). The axle 544 of the filter paddle 540 may be fit into the socket 566 and may snap therein once so positioned. The slidable filter paddle 540 may additionally comprise a handle 541 which may be used to slide the slidable filter paddle 540 along a trajectory 570 to the engaged position.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments. In this regard, directional terminology, such as "vertical," "horizontal," "top," "bottom," "front," "back," "left," "right," etc., is used with reference to the orientation of the drawing(s) being described. Because components of the embodiments can be positioned in a number of different orientations, the directional terminology is used for purposes of illustration and is in no way limiting.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

The invention claimed is:

1. An in-line vacuum filter comprising:
   a manifold comprising an inlet, an outlet, a collecting container, and an actuatable filter paddle,
      wherein a flow of air generated by a source of negative pressure travels from the inlet to the outlet,
      wherein the actuatable filter paddle is disposed within the manifold such that it can be actuated between a first position and a second position,
      wherein in the first position, the actuatable filter paddle is placed within the flow of air,
      wherein in the second position, the actuatable filter paddle is removed from the flow of air,
      wherein the actuatable filter paddle comprises an arcuate concave filter having an axle to which a lever for actuating the actuatable filter paddle is attached,
      wherein the arcuate concave filter comprises a plurality of apertures,
      wherein when the actuatable filter paddle is in the first position, the arcuate concave filter allows passage of particulate matter to the outlet and diverts objects larger than a width of the apertures away from the flow of air,
      wherein the objects larger than the width of the apertures are diverted into a removable collection container of the manifold, wherein a curvature and a concavity of the arcuate concave filter are configured to gradually divert the momentum of objects larger than the width of the apertures without causing disintegration of said objects due to impact against the arcuate concave filter, wherein the apertures are elongate and have a uniform width of approximately 1 mm, wherein the actuatable filter paddle is actuated between the first position and the second position through an actuation method selected from the group consisting of: sliding the actuatable filter paddle, rotating the actuatable filter paddle around an axis extending through the axle, and wherein the actuatable filter paddle is actuated between the first position and the second position by rotating the actuatable filter paddle around an axis extending through the axle.

2. The in-line vacuum filter of claim 1, wherein the flow of air is largely unimpeded regardless of whether the actuatable filter paddle is in the first position or the second position.

3. The in-line vacuum filter of claim 1, wherein the manifold comprises a lipped portion on an interior surface thereof, wherein the lipped portion holds the actuatable filter paddle in the first position as the flow of air passes through the actuatable filter paddle.

* * * * *